United States Patent [19]

Hosaka

[11] Patent Number: 6,156,690
[45] Date of Patent: Dec. 5, 2000

[54] SOLID CATALYST COMPONENT AND CATALYST FOR POLYMERIZATION OF OLEFINS

[75] Inventor: Motoki Hosaka, Kanagawa, Japan

[73] Assignee: Toho Titanium Co., Ltd., Chigasaki, Japan

[21] Appl. No.: 09/147,729

[22] PCT Filed: Jun. 23, 1998

[86] PCT No.: PCT/JP98/02788

§ 371 Date: Feb. 25, 1999

§ 102(e) Date: Feb. 25, 1999

[87] PCT Pub. No.: WO99/00428

PCT Pub. Date: Jan. 7, 1999

[30] Foreign Application Priority Data

Jun. 26, 1997 [JP] Japan .................................. 9-185901

[51] Int. Cl.$^7$ .............................. B01J 21/00; B01J 21/06; B01J 21/10
[52] U.S. Cl. .................... 502/118; 502/103; 502/125; 502/126; 502/127
[58] Field of Search ................................. 502/103, 118, 502/125, 126, 127

[56] References Cited

U.S. PATENT DOCUMENTS

| | | | |
|---|---|---|---|
| 4,980,329 | 12/1990 | Barbe et al. ............................ | 502/111 |
| 5,494,872 | 2/1996 | Hosaka et al. ......................... | 502/115 |
| 5,498,770 | 3/1996 | Hosaka et al. ......................... | 502/116 |
| 5,684,173 | 11/1997 | Hosaka et al. ......................... | 556/482 |

*Primary Examiner*—Mark L. Bell
*Assistant Examiner*—Michael J. DiVerdi
*Attorney, Agent, or Firm*—Oblon, Spivak, McClelland, Maier & Neustadt, P.C.

[57] ABSTRACT

The present invention provides a solid catalyst component for polymerization of olefins obtained by allowing a solid component and an alcohol to come in contact with each other, wherein the solid component is prepared by allowing a magnesium compound, a titanium compound and an electron donor compound to come in contact with each other, and also provides a catalyst for polymerization of olefins made of the solid catalyst component, an organic aluminum compound represented by the general formula $R^1_p AlQ_{3-p}$ and an organic silicon compound represented by the general formula $R^2_q Si(OR^3)_{4-q}$. By using the catalysts in a polymerization of olefins, polyolefins excellent in stereoregularity can be obtained in high yield.

10 Claims, No Drawings

SOLID CATALYST COMPONENT AND CATALYST FOR POLYMERIZATION OF OLEFINS

TECHNICAL FIELD

The present invention relates to a solid catalyst component and catalyst for polymerization of olefins, which can provide a polymer having a high stereoregularity in a high yield.

TECHNICAL BACKGROUND

Many proposals have been made and known for a solid catalyst component containing magnesium, titanium, an electron donor compound and halogen as essential components and a process for the polymerization or co-polymerization of olefins in the presence of a catalyst for polymerization of olefins comprising said solid catalyst component, an organic aluminum compound and an organic silicon compound. For example, JP-A-57-63310 and JP-A-57-63311 (The term "JP-A as used herein means an "unexamined published Japanese patent application") propose a process for polymerizing an olefin having 3 or more carbon atoms using a catalyst system comprising a solid catalyst component containing a magnesium compound, a titanium compound and an electron donor compound, an organic aluminum compound and an organic silicon compound having Si—O—C bond. However, these processes are not always satisfactory for obtaining highly stereoregular polymers in high yield, and further improvement has been demanded.

On the other hand, JP-A-63-3010 discloses a catalyst system for the polymerization of olefins and a process for polymerizing olefins using the same, the catalyst system comprising a solid catalyst component prepared by bringing a dialkoxymagnesium, a diester of an aromatic carboxylic acid, an aromatic hydrocarbon and a titanium halide into contact and subjecting the resulting product in a powdered state to a heat treatment, an organic aluminum compound and an organic silicon compound. JA-A-1-315406 discloses a catalyst system for polymerizing olefins comprising a solid catalyst component prepared by bringing titanium tetrachloride with a suspension formed by diethoxymagnesium with an alkylbenzene, adding phthalic dichloride thereto to react to obtain a solid product, and further contacting the resulting solid product with titanium tetrachloride in the presence of an alkylbenzene, an organic aluminum compound and an organic silicon compound, and a process for polymerizing olefins in the presence of said catalyst system. The foregoing known techniques focus on the development of a catalyst component having a high activity enough to allow the omission of a so-called deashing step, i.e., step of removing catalyst residues such as chlorine and titanium remaining in the polymer produced as well as on the enhancement of the yield of stereoregular polymer or an improvement in durability of the catalyst activity for polymerization, and achieved excellent results to these purposes.

The propylene polymer obtaining by using the forgoing catalysts, so-called a crystalline polypropylene, has a high rigidity and shows a superior heat-resistability caused by having generally a high heat-deforming temperature, a high melting point and a high crystallization temperature and is utilized in various uses, e.g., a container or a film other than a molded product of automobile or household appliances.

In recent years, however, from the standpoint of energy saving or conservation of resources related to the global environmental issue, it has been keenly desired to reduce the weight of plastics for use in automobile, household appliance, etc. In order to solve this problem, the thickness of molded plastic articles needs to be reduced while maintaining its strength such as impact strength. Regarding polyolefins, to improve of rigidity of resin has been an important problem by improving technology of compounding polymers and enhancing crystallinity of base polymer by polymerization technology, etc. in order to solve these problems.

However, the foregoing known techniques are not enough to solve the problems, and it is desired to develop a solid catalyst component for polymerizing olefins or a catalyst system using the same which can enhance the stereoregularity or crystallinity of base polymer itself.

The present invention is intended to solve the foregoing problems remaining in the prior art techniques. In other words, an object of the present invention is to provide a solid catalyst component and catalyst for polymerization of olefins, which can provide a superior stereoregularity polymer in high yield.

DISCLOSURE OF THE INVENTION

As a result of extensive investigations to solve the foregoing problems remaining in the prior art techniques, the present inventor has found that an olefin polymer having a high stereoregularity can be obtained in high yield by polymerizing an olefin(s) using a solid catalyst component obtaining by contacting and reacting a solid component containing magnesium, titanium, an electron donor compound and a halogen as essential components with an alcohol, or a catalyst comprising said solid catalyst component, an organoaluminium compound and an organic silicon compound.

In other words, the present invention is a solid catalyst component (A) for polymerization of olefins, wherein the solid catalyst component is obtained by contacting a solid component containing magnesium, titanium, an electron donor compound and a halogen atom prepared by contacting a magnesium compound, a titanium compound and an electron donor compound, with an alcohol. Further, the present invention is also a catalyst for polymerization of olefins, the catalyst comprising the foregoing solid catalyst component (A), and the following components (B) and (C):

(B) An organoaluminium compound represented by the general formula (1):

$$R^1_p AlQ_{3-p} \qquad (1)$$

wherein $R^1$ represents a $C_{1-4}$ alkyl group; Q represents a hydrogen or halogen atom; and p represents a real number of from more than 0 to not more than 3; and (C) An organic silicon compound represented by the general formula (2):

$$R^2_q Si(OR^3)_{4-q} \qquad (2)$$

wherein $R^2$ represents a $C_{1-12}$ alkyl, cycloalkyl, phenyl, vinyl, allyl or aralkyl group which may be the same or different; $R^3$ represents a $C_{1-4}$ alkyl, cycloalkyl, phenyl, vinyl, allyl or aralkyl group which may be the same or different; and q represents 0 or an integer of from 1 to 3.

BEST EMBODIMENT FOR IMPLEMENTING THE INVENTION

Preferred examples of the magnesium compound used for preparing a solid component (a) (hereinafter occasionally referred to as "component (a)") constituting the solid catalyst component (A) for polymerization of olefins of the present invention (hereinafter occasionally referred to as "component (A)") include magnesium dihalide, dialkylmagnesium, alkylmagnesium halide, dialkoxymagnesium, diaryloxymagnesium, alkoxymagnesium halide and fatty acid salt of magnesium, etc.

Examples of the magnesium dihalide include magnesium dichloride, magnesium dibromide, magnesium diiodide and magnesium difluoride, etc.

Preferred dialkyl magnesium is the compound represented by the general formula $R^4R^5Mg$ wherein $R^4$ and $R^5$ represent a $C_{1-10}$ alkyl group which may be the same or different. Specific examples of such dialkylmagnesium include dimethylmagnesium, diethylmagnesium, methylethylmagnesium, dipropylmagnesium, methypropylmagnesium, ethylpropylmagnesium, dibutylmagnesium, methylbutylmagnesium and ethylbutylmagnesium, etc. Such dialkylmagnesium may be obtained by reacting magnesium metal with halogenated hydrocarbon or alcohol.

Preferred alkyl magnesium halide is the compound represented by the general formula $R^6MgD^1$ wherein $R^6$ represents a $C_{1-10}$ alkyl group, $D^1$ represents a halogen atom such as chlorine, bromine, iodine or fluorine. Specific examples of alkylmagnesium halide include ethylmagnesium chloride, propylmagnesium chloride, butylmagnesium chloride, etc. These magnesium halides may be obtained by reacting magnesium metal with halogenated hydrocarbon or alcohol.

Preferred dialkoxymagnesium or diaryloxymagnesium is the compound represented by the general formula $Mg(OR^7)(OR^8)$ wherein $R^7$ and $R^8$ may be the same or different and each represent a $C_{1-10}$ alkyl group or aryl group. Specific examples of dialkoxymagnesium or diaryloxymagnesium include dimethoxymagnesium, diethoxymagnesium, dipropoxymagnesium, dibutoxymagnesium, diphenoxymagnesium, ethoxymethoxymagnesium, ethoxypropoxymagnesium and butoxyethoxymagnesium, etc. These dialkoxymagnesium or diaryloxymagnesium may be obtained by reacting magnesium metal with alcohol in the presence of a halogen or a halogenated metal compound.

Preferred alkoxymagnesium halide is the compound represented by the general formula $Mg(OR^9)D^2$ wherein $R^9$ represents a $C_{1-10}$ alkyl group and $D^2$ represents a halogen atom such as chlorine, bromine, iodine or fluorine. Specific examples of alkoxymagnesium halide include methoxymagnesium chloride, ethoxymagnesium chloride, propoxymagnesium chloride and butoxymagnesium chloride, etc.

Preferred fatty acid salt of magnesium is the compound represented by the general formula $Mg(R^{10}COO)_2$ wherein $R^{10}$ represents a $C_{1-20}$ hydrocarbon group. Specific examples of the fatty acid salt of magnesium include magnesium laurate, magnesium stearate, magnesium octanoate and magnesium decanoate, etc.

Among these magnesium compounds in the present invention, the dialkoxymagnesium is used preferably. Particularly preferred among these dialkoxymagnesiums is diethoxymagnesium or di-n-propoxymagnesium. The forgoing magnesium compounds may be used singly or in combination of two or more of them.

The dialkoxymagnesium may be used in granular or powder form to prepare the solid component (a) in the present invention. The particle shape of the dialkoxymagnesium may be amorphous or spherical. If a spherical particulate dialkoxymagnesium is used, a polymer powder having a better particle shape and a narrower particle size distribution can be obtained. Thus, the polymer powder produced can be easily handled during the polymerization, eliminating troubles such as blocking caused by the fine powder contained in the polymer powder produced.

The foregoing spherical particulate dialkoxymagnesium does not necessarily need to be truly spherical but may be ellipsoidal or pebble-like. In some detail, the sphericity of the particle is normally not more than 3, preferably from 1 to 2, more preferably from 1 to 1.5 as calculated in terms of the ratio of major axis length l to minor axis length w (l/W). The process for preparing such spherical particulate dialkoxymagnesium is disclosed in JP-A-58-41832, JP-A-62-51633, JP-A-3-74341, JP-A-4-368391, and JP-A-8-73388.

Further, the foregoing dialkoxymagnesium may have an average particle diameter of normally from 1 $\mu$m to 200 $\mu$m, preferably from 5 $\mu$m to 150 $\mu$m. The foregoing spherical particulate dialkoxymagnesium has an average particle diameter of normally from 1 $\mu$m to 100 $\mu$m, preferably from 5 $\mu$m to 50 $\mu$m, more preferably from 10 $\mu$m to 40 $\mu$m. Further, referring to its particle size, the foregoing spherical particulate compound preferably has a narrow particle size distribution comprising less fine or coarse powder. In some detail, the particle size distribution comprises particles having a particle size of not more than 5 $\mu$m in an amount of not more than 20%, preferably not more than 10%, and particles having a particle size of at least 100 $\mu$m in an amount of not more than 10%, more preferably not more than 5%. The particle size distribution is not more than 3, preferably not more than 2 as calculated in terms of ln (D90/D10) wherein D90 represents the particle diameter at the point where the accumulated particle size reaches 90% and D10 represents the particle diameter at the point where the accumulated particle size reaches 10%.

Examples of the titanium compound to be used in the preparation of the solid component (a) of the present invention is titanium halide and alkoxytitanium halide represented by the general formula $Ti(OR^{11})_nX_{4-n}$ wherein $R^{11}$ represents a $C_{1-4}$ alkyl group; X represents a halogen atom such as chlorine, bromine and iodine; and n represents 0 or an integer of from 1 to 3. Further, the forgoing titanium compounds may be used singly or in combination of two or more of them.

Specific examples of such a titanium compound include a titanium tetrahalide such as $TiCl_4$, $TiBr_4$ and $TiI_4$, an alkoxytitanium halide such as $Ti(OCH_3)Cl_3$, $Ti(OC_2H_5)Cl_3$, $Ti(OC_3H_7)Cl_3$, $Ti(O-nC_4H_9)Cl_3$, $Ti(OCH_3)_2Cl_2$, $Ti(OC_2H_5)_2Cl_2$, $Ti(OC_3H_7)_2Cl_2$, $Ti(O-n-C_4H_9)_2Cl_2$, $Ti(OCH_3)_3Cl$, $Ti(OC_2H_5)_3Cl$, $Ti(OC_3H_7)_3Cl$, and $Ti(O-n-C_4H_9)_3Cl$. Preferred among these titanium compounds is titanium tetrahalide. Particularly preferred is $TiCl_4$. These titanium compounds may be used singly or in combination of two or more of them.

The electron donor compound, which can be used in the preparation of the solid component (a) of the present invention, is an organic compound containing oxygen or nitrogen. For instance, such compounds include alcohols, phenols, ethers, esters, ketones, acid halides, aldehydes, amines, amides, nitriles, isocyanates, and organic silicon compounds containing a Si—O—C bond.

Specific examples of the electron donor compound include alcohols such as methanol, ethanol, n-propanol, and 2-ethylhexyl alcohol; phenols, such as phenol and cresol; ethers, such as dimethyl ether, diethyl ether, dipropyl ether, dibutyl ether, diamyl ether, and diphenyl ether; monocarboxylic acid esters, such as methyl formate, ethyl acetate, vinyl acetate, propyl acetate, octyl acetate, cyclohexyl acetate, ethyl propionate, ethyl butyrate, methyl benzoate, ethyl benzoate, propyl benzoate, butyl benzoate, octyl benzoate, cyclohexyl benzoate, phenyl benzoate, methyl p-toluylate, ethyl p-toluylate, methyl anisate, and ethyl anisate; dicarboxylic acid esters, such as diethyl maleate, dibutyl maleate, dimethyl adipate, diethyl adipate, dipropyl adipate, dibutyl adipate, diisodecyl adipate, dioctyl adipate, dimethyl phthalate, diethyl phthalate, dipropyl phthalate, dibutyl phthalate, dipentyl phthalate, dihexyl phthalate, diheptyl phthalate, dioctyl phthalate, dinonyl phthalate, and didecyl phthalate; ketones, such as acetone, methyl ethyl ketone, methyl butyl ketone, acetophenone, and bezophenone; acid halides, such as phthalic acid dichloride and terephthalic acid dichloride; aldehydes, such as acetaldehyde, propionaldehyde, octylaldehyde, and benzaldehyde; amines, such as methylamine, ethyl-amine, tributylamine, piperidine, aniline, and pyridine; amides, such as oleic acid amide and stearic acid amide; nitriles, such as acetonitrile, benzonitrile, and tolunitrile; and isocyanates, such as methyl isocyanate, and ethyl isocyanate.

Specific examples of the organic silicon compound containing a Si—O—C bond are phenylalkoxysilane, alkylalkoxysilane, phenylalkylalkoxysilane, cycloalkylalkoxysilane and cycloalkylalkylalkoxysilane.

Among these electron donor compounds preferred are esters, with phthalic diesters being more preferred. Specific examples of these phthalic diesters include dimethyl phthalate, diethyl phthalate, di-n-propyl phthalate, diisopropyl phthalate, di-n-butyl phthalate, diisobutyl phthalate, ethylmethyl phthalate, methylisopropyl phthalate, ethyl-n-propyl phthalate, ethyl-n-butyl phthalate, di-n-pentyl phthalate, diisopentyl phthalate, dihexyl phthalate, di-n-heptyl phthalate, di-n-octyl phthalate, bis(2,2-dimethylhexyl) phthalate, bis(2-ethylhexyl) phthalate, di-n-nonyl phthalate, diiosdecyl phthalate, bis(2,2-dimethylheptyl) phthalate, n-butylisohexyl phthalate, n-butyl(2-ethylhexyl) phthalate, n-pentylhexyl phthalate, n-pentylisohexyl phthalate, isopentylheptyl phthalate, n-pentyl(2-ethylhexyl) phthalate, n-pentylisononyl phthalate, isopentyl(n-decyl) phthalate, n-pentylundecyl phthalate, isopentylisohexyl phthlate, n-hexyl(2-ethylhexyl) phthalate, n-hexylisononyl phthalate, n-hexyl-n-decyl phthalate, n-heptyl(2-ethylhexyl) phthalate, n-heptylisononyl phthalate, n-heptylneodecyl phthalate, and 2-ethylhexylisononyl phthalate. These phthalic acid esters may be used either individually or in combination of two or more thereof.

Preferably, two or more diesters of phthalic acid may be used. Their combination is preferably such that the difference between the sum of the number of carbon atoms contained in two alkyl groups in one phthalic acid ester and the sum of the number of carbon atoms contained in two alkyl groups in another phthalic acid diester is at least 4.

In the preparation process of the solid component (a) of this invention, an aluminum compound, a metal salt of an organic acid or a polysiloxane may be used other than the forgoing essential components.

Specific examples of the aluminum compound are aluminum trichloride, diethoxy aluminum chloride, diisopropoxy aluminum chloride, ethoxy aluminum dichloride, isopropoxy aluminum dichloride, buthoxy aluminum dichloride, triethoxy aluminum.

Specific examples of the metal salt of an organic acid are sodium stearate, magnesium stearate and aluminum stearate.

As polysiloxanes there may be used one or more compounds represented by the following general formula:

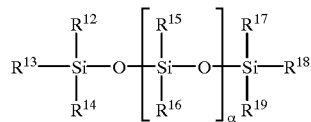

In the foregoing general formula, α represents an average polymerization degree of from 2 to 30,000. Most of $R^{12}$ to $R^{19}$ each represents a methyl group. A phenyl group, hydrogen atom, $C_{10\text{-}20}$ higher fatty acid residue, epoxy-containing group or $C_{1\text{-}10}$ polyoxyalkylene group may substitute some of $R^{12}$ to $R^{19}$. The compound represented by the forgoing general formula may form a cyclic polysiloxane in which $R^{15}$ and $R^{16}$ are methyl group.

The polysiloxane is known generically as silicone oil. It is a chain, partial hydrogenated, cyclic or denatured polysiloxane having a viscosity of from 2 to 10,000 cSt, preferably from 3 to 500 cSt, at 25° C. which stays liquid or viscous at room temperature.

Specific examples of the polysiloxane are dimethyl polysiloxane and methyl phenyl polysiloxane as a chain polysiloxane, methyl hydrogen polysiloxane of which the rate of hydrogenation is 10 to 80% as a partial hydrogenated polysiloxane, hexamethylcyclotrisiloxane, octamethylcyclotetrasiloxane, decamethylcyclopentasiloxane, 2,4,6-trimethylcyclotrisiloxane, and 2,4,6,8-tetramethylcyclotetrasiloxane as a cyclic polysiloxane and higher fatty acid-substituted dimethylsiloxane, epoxy-substituted dimethylsiloxane, and polyoxyalkylene-substituted dimethylsiloxane as a denatured polysiloxane.

The above-described solid component (a) can be prepared by contacting the above-mentioned magnesium compound, titanium compound and electron donor compound in a manner appropriately selected from conventional means. Known methods for preparing a solid component are disclosed, e.g., in JP-A-63-308004, JP-A-63-314211, JP-A-64-6006, JP-A-64-14210, JP-A-64-43506, JP-A-63-3010, and JP-A-62-158704.

This contact can proceed in the absence of inert organic solvent but preferably in the presence of inert organic solvent taking into account the ease of operation. Examples of the inert organic solvent employable herein include saturated hydrocarbon such as hexane, heptane and cyclohexane, aromatic hydrocarbon such as benzene, toluene, xylene and ethylbenzene, and halogenated hydrocarbon such as orthodichlorobenzene, methylene chloride, carbon tetrachloride and dichloroethane. In particular, aromatic hydrocarbons of liquid state at a room temperature having a boiling point of from about 90 to 150° C. are preferred. Specific examples of such aromatic hydrocarbons include toluene, xylene, and ethylbenzene.

Examples of methods for preparing the solid component (a) include the method for obtaining a solid component by precipitating a solid matter by contacting an electron donor compound or an electron donor compound and a titanium compound, or heat treatment with the solution of the forgoing magnesium compound dissolved in a alcohol or a titanium compound; and the method for obtaining a solid component by contacting and treating the suspension of a magnesium compound in a titanium compound or an inert hydrocarbon solvent with an electron donor compound or an electron donor compound and a titanium compound. Among the above-mentioned methods, the particles of the solid component obtained by the former method is almost spherical and have a narrow particle size distribution. And, in the latter method, by using a spherical magnesium compound, the solid catalyst component having a spherical particle and narrow particle size distribution can be obtained. Moreover, the solid component having a spherical particle and narrow particle size distribution can be also obtained, for example, by forming a particle by so called a "spray-drying method" in which a solution or a suspension is sprayed and dried by using a spraying apparatus.

The contact for each component is conducted under an atmosphere of an inert gas and a condition of eliminating water, etc. with stirring in a vessel with agitator. The temperature for contacting can be set up at relatively low temperature range of around room temperature in the case of simply mixing with stirring after contacting or conducting a denatured treatment by dispersing or suspending. However, in the case of obtaining a product by reacting after contacting, the temperature for contacting is preferably at the temperature range from 40 to 130° C. If the temperature at reaction is less than 40° C., such reaction is not proceeded completely and the efficiency of the resulting solid component becomes insufficient. If the temperature of the reaction exceeds 130° C., the reaction is hard to control because the solvent used in reaction vaporizes extremely. The time for reaction is usually 1 minute or more, preferably 10 minutes or more, more preferably, 30 minutes or more.

Typical methods for preparing solid component (a) are described below;

(1) Magnesium chloride is dissolved in a tetraalkoxy titanium, and the solution is brought into contact with polysiloxane to obtain a solid product. The solid product is then allowed to react with titanium tetrachloride, contacted with phthalic acid chloride, and allowed to react with titanium tetrachloride to prepare solid component (a). The resulting solid component (a) may be preliminarily treated with an organic aluminum compound, an organosilicon compound, and an olefin.

(2) Anhydrous magnesium chloride and 2-ethylhexyl alcohol are reacted to form a uniform solution, which is then brought into contact with phthalic anhydride. The resulting solution is then brought into contact with titanium tetrachloride and diester of phthalic acid to obtain a solid product, which is further brought into contact with titanium tetrachloride to prepare solid component (a).

(3) Metallic magnesium, butyl chloride, and dibutyl ether are allowed to react to synthesize an organomagnesium compound. The organo-magnesium compound is brought into contact with tetrabutoxy-titanium and tetraethoxysilane to obtain a solid product, which is then brought into contact with a diester of phthalic acid, dibutyl ether, and titanium tetrachloride to prepare solid component (a). The resulting solid component may be preliminarily treated with an organic aluminum compound, an organosilicon compound, and an olefin.

(4) An organomagnesium compound, e.g., dibutylmagnesium, and an organic aluminum compound are brought into contact with an alcohol, e.g., butanol or 2-ethylhexyl alcohol, in the presence of a hydrocarbon solvent to form a uniform solution. The resulting solution is brought into contact with a silicon compound, e.g., $SiCl_4$, $HSiCl_3$ or polysiloxane, to obtain a solid product. The solid product is brought into contact with titanium tetrachloride and a diester of phthalic acid in the presence of an aromatic hydrocarbon solvent, and the reaction mixture is further brought into contact with titanium tetrachloride to obtain solid component (a).

(5) Magnesium chloride, a tetraalkoxytitanium, and an aliphatic alcohol are brought into contact in the presence of an aliphatic hydrocarbon to form a uniform solution. Titanium tetrachloride is then added to the solution, and the mixture is heated to precipitate a solid product. The solid product is contacted with a diester of phthalic acid and further is allowed to react with titanium tetrachloride to prepare solid component (a).

(6) Metallic magnesium powder, an alkyl monohalide, and iodine are contacted. The resulting reaction product, a tetra-alkoxytitanium, an acid halide, and an aliphatic alcohol are contacted in the presence of an aliphatic hydrocarbon to form a uniform solution. Titanium tetrachloride is added to the solution, and the mixture is heated to precipitate a solid component. The solid component is brought into contact with a diester of phthalic acid and further reacted with titanium tetrachloride to prepare solid component (a).

(7) Diethoxymagnesium is suspended in an alkylbenzene or a halogenated hydrocarbon solvent, and the resulting suspension is brought into contact with titanium tetrachloride. The mixture is heated and then contacted with a diester of phthalic acid to obtain a solid product. The solid product is washed with an alkylbenzene and again contacted with titanium tetrachloride in the presence of the alkylbenzene to prepare solid component (a). The resulting solid component may be subjected to a heat treatment in the presence or absence of a hydrocarbon solvent.

(8) Diethoxymagnesium is suspended in an alkylbenzene, and the resulting suspension is brought into contact with titanium tetrachloride and phthalic acid chloride to obtain a solid product. The solid product is washed with an alkylbenzene and again contacted with titanium tetrachloride in the presence of the alkylbenzene to prepare solid component (a). The resulting solid component may further be contacted with titanium tetrachloride twice or more times.

(9) Diethoxymagnesium, calcium chloride, and a silicon compound represented by $Si(OR^{20})_4$ (wherein $R^{20}$ is an alkyl group or an aryl group ) or co-ground, and the resulting grinds are suspended in an aromatic hydrocarbon. The suspension is brought into contact with titanium tetrachloride and an diester of phthalic acid, and the product is further contacted with titanium tetrachloride to prepare solid component (a).

(10) Diethoxymagnesium and a diester of phthalic acid are suspended in an alkylbenzene, and the suspension is added to titanium tetrachloride to obtain a solid product. The solid product is washed with an alkylbenzene, and further contacted with titanium tetrachloride in the presence of the alkylbenzene to prepare solid component (a).

(11) A calcium halide and a fatty acid salt of magnesium, e.g., magnesium stearate, are contacted and reacted with titanium tetrachloride and an aromatic dicarboxylic acid diester, and the reaction product is further brought into contact with titanium tetrachloride to prepare solid component (a).

(12) Diethoxymagnesium is suspended in an alkylbenzene or a halogenated hydrocarbon solvent, and the resulting suspension is brought into contact with titanium tetrachloride, and the mixture is heated and contacted with a diester of phthalic acid to obtain a solid product. The resulting solid product is washed with an alkylbenzene and further contacted with titanium tetrachloride in the presence of the alkylbenzene to prepare solid component (a). At any stage of the above preparation procedure, the system is brought into contact with aluminum chloride.

(13) Diethoxymagnesium is suspended in an alkylbenzene or a halogenated hydrocarbon solvent, and the resulting suspension is brought into contact with titanium tetrachloride, and the mixture is heated and contacted with two or more diesters of phthalic acid different in the carbon atom number of the alkyl moiety to obtain a solid product. The resulting solid product is washed with an alkylbenzene and further contacted with titanium tetrachloride in the presence of the alkylbenzene to prepare solid component (a). In the above preparation, when the solid product is brought into contact with the second titanium tetrachloride, it may again contacted with two or more diesters of phthalic acid different in the carbon atom number of the alkyl group. And also, the above-mentioned electron donor compound other than the diesters of phthalic acid can be used with the diesters of phthalic acid.

(14) Diethoxymagnesium, titanium tetrachloride and a diester of phthalic acid are contacted and reacted with each other in the presence of chloro benzene and the resulting product is brought into contact with titanium tetrachloride and a phthalic acid dichloride and further contacted with titanium tetrachloride to prepare solid component (a). The resulting solid component may further be brought into contact with titanium tetrachloride, and further, a silicon compound may be used in any step of the forgoing contact or contacting reaction.

(15) Diethoxymagnesium, 2-ethylhexylalcohol and carbon dioxide are contacted and reacted with each other in the presence of toluene to prepare a homogeneous solution, and the solution is further brought into contact with titanium tetrachloride and a diester of phthalic acid to obtain a solid product, and further the solid product is dissolved in tetrahydrofulan to precipitate a slid product. The solid product precipitated is brought into contact with titanium tetrachloride and, if necessary, repeated the contact with titanium tetrachloride to prepare solid component (a). The silicon compound such as tetrabutoxysilane may be used in any step of the forgoing contacting, reacting or dissolving step.

(16) Magnesium dichloride, an organic epoxy compound and a phosphoric acid compound are suspended in a hydrocarbon solvent such as toluene and heated to prepare a homogeneous solution. Phthalic anhydride and titanium tetrachloride are contacted and reacted with the solution to obtain a solid product and a diester of phthalic acid is reacted with the solid product. The resulting reaction product is washed with an alkyl benzene and contacted again with titanium tetrachloride in the presence of the alkyl benzene to prepare solid component (a).

(17) A dialkoxy magnesium, a titanium compound and a diester of an aromatic dicarboxylic acid are contacted and reacted each other in the presence of toluene to obtain a solid product, and a silicon compound such as a polysiloxane is contacted and reacted with the reaction product, and further contacted and reacted with titanium tetrachloride. The solid product is contacted and reacted with a metal salt of an organic acid and contacted again with titanium tetrachloride to prepare solid component (a).

Preferred examples of the process for the preparation of the solid component (a) used in the present invention will be given below:

A dialkoxymagnesium is suspended in an aromatic hydrocarbon compound, which states liquid at a room temperature to form a suspension. To the suspension thus obtained is brought into contact with a tetravalent halogenated titanium at −20 to 100° C., preferably −10 to 70° C., more preferably 0 to 30° C. and reacted at 0 to 130° C., preferably 70 to 120° C. In the procedure, before or after the suspension is brought into contact with a halogenated titanium, one or two or more diester of an aromatic dicarboxylic acid is contacted at −20 to 130° C. to obtain a solid reaction product. The solid reaction product is washed with an aromatic hydrocarbon compound which states liquid at a room temperature, and brought into contact again with a tetravalent halogenated titanium in the presence of an aromatic hydrocarbon compound at 0 to 130° C., preferably 70 to 120° C., and further washed with a hydrocarbon compound which states liquid at a room temperature to obtain solid component (a). The proportion of amount of each compound to be used is not specifically limited because it is differed depending on the preparation method. Specific examples of the proportion of a tetravalent halogenated titanium is from 0.5 to 100 mols, preferably from 0.5 to 50 mols, more preferably from 1 to 10 mols per mol of a dialkoxy magnesium. The proportion of a diester of an aromatic dicarboxylic acid is from 0.01 to 10 mols, preferably from 0.01 to 1 mol, more preferably from 0.02 to 0.6 mol per mol of a dialkoxy magnesium.

The solid component (a) prepared above comprises magnesium, titanium, an electron donor compound and a halogen atom. The content of each component is not specified, however, preferably the content of magnesium is from 10 to 30% by weight, the content of titanium is from 1 to 5% by weight, the content of the electron donor compound is from 1 to 20% by weight and the content of the halogen atom is from 40 to 70% by weight.

In the present invention, the solid catalyst component (A) is prepared by contacting the solid component (a) prepared by the method mentioned-above with an alcohol. In the procedure, the solid component (a) is necessary to contact with said alcohol after eliminating free titanium in the solid component (a) by washing with a hydrocarbon solvent. Specific examples of the method will be given below, although the method for contacting with an alcohol is not specifically limited:
(1) Method of contacting the solid component (a) with a liquid alcohol; and
(2) Method of vaporizing an alcohol and contacting the solid component (a) with the vaporized alcohol.

In the procedure mentioned above, the solid component (a) may be contacted in the solid state, namely, powdery state or in the suspended state in a hydrocarbon compound which states liquid at a room temperature, specifically a saturated hydrocarbon compound such as hexane, heptane and cyclohexane. The alcohol may be used without dilution or used by diluting with a hydrocarbon compound, which states liquid at a room temperature, specifically a saturated hydrocarbon compound such as hexane, heptane and cyclohexane. For example, as explained in the preferable method for preparing a solid component (a) above, after the solid component is washed with a hydrocarbon which states liquid at a room temperature at several times, the solid component (a) is suspended with the hydrocarbon by adding a fresh hydrocarbon. An alcohol may be added to the suspension. Needless to say that it is necessary to eliminate the free titanium in the suspension efficiently in the procedure.

As an alcohol to be used for preparing the solid catalyst component (A), a mono or poly valent alcohol having 1 to 12 carbon atom may be used. Specific examples are momoalcols such as methanol, ethanol, n-propanol, iso-propanol, n-butanol, iso-butanol, s-butanol, t-butanol, n-amylalcohol, activated-amylalcohol, iso-amylalcohol, s-amylalcohol, 3-pentanol, t-amylalcohol, n-hexanol, methyamylalcohol, 2-ethylbutanol, n-heptanol, 2-heptanol, 3-heptanol, n-octanol, 2-octanol, 2-ethylhexanol, 3,5,5- trimethylhexanol, nonanol, n-decanol, undecanol and n-dodecanol, polyalcohols such as ethylene glycol, propylene glycol, trimethlene glycol, butandiol, 1,5-pentadiol, hexylene glycol, octylene glycol, glycerine, 1,2,6-hexan triol, erythritol, pentaerythritol and hexytol. These alcohols may be used singly or in combination of two or more of them.

An amount of an alcohol to be used is optionally as far as obtaining the effect of the invention. Preferably, the amount of an alcohol is from 0.005 to 10 mols, more preferably from 0.01 to 5 mols, particularly preferably from 0.01 to 2 mols per mol of titanium atom in the solid component (a). The temperature for contacting is from −20 to 120° C., preferably from 0 to 100° C., more preferably from 10 to 80° C. and time for contacting is 1 minute or more, preferably 10 minutes or more, more preferably from 30 to 120 minutes.

Although the content of magnesium, titanium, an electron donor compound and a halogen atom in the solid catalyst component (A) prepared above is not specifically limited, the content of magnesium is prefeably from 10 to 30% by weight, the content of titanium is preferably from 1 to 4% by weight, the content of the electron donor compound is preferably from 1 to 20% by weight and the content of the halogen atom is preferably from 40 to 70% by weight.

As the organic aluminum compound (B) to be used with the solid catalyst component (A) mentioned above to form a catalyst for polymerization of olefins of the present invention, there may be used one represented by the general formula: $R^1_p AlQ_{3-p}$ (in which $R^1$ represents a $C_{1-4}$-alkyl group; Q represents a hydrogen atom or halogen atom; and p represents a real number of more than 0 to not more than 3). Specific examples of the organic aluminum compound (B) include triethylaluminum, diethylaluminum chloride, tri-iso-butyl-aluminum, diethylaluminum bromide, and diethylaluminum hydride. These organic aluminum compounds may be used singly or in combination of two or more of them. Preferred among these organic aluminum compounds are triethylaluminum, and tri-iso-butylaluminum.

As the organic silicon compound (C) to be used in the present invention there may be used a compound represented by the general formula $R^2_q Si(OR^3)_{4-q}$, (in which $R^2$ may be the same or different and represents a $C_{1-12}$-alkyl, cycloalkyl, phenyl, vinyl, allyl or aralkyl group; $R^3$ may be the same or different and represents a $C_{1-4}$-alkyl, cycloalkyl, phenyl, vinyl, allyl or aralkyl group; and q represents 0 or an integer of from 1 to 3). Specific examples of the organic silicon compound (C) include phenylalkoxysilane, alkylalkoxysilane, phenylalkylalkoxysilane, cycloalkylalkoxysilane and cycloalkylalkylalkoxysilane.

Specific examples of the foregoing organic silicon compound include trimethylmethoxysilane, trimethylethoxysilane, tri-n-propylmethoxysilane, tri-n-propylethoxysilane, tri-n-butylmethoxysilane, tri-iso-butylmethoxysilane, tri-t-butylmethoxysilane, tri-n-butylethoxysilane, tricyclohexylmethoxysilane, tricyclohexylethoxysilane, cyclohexyldimethylmethoxysilane, cyclohexyldiethylmethoxysilane, cyclohexyldiethylethoxysilane, dimethyldimethoxysilane, dimethyldiethoxysilane, di-n-propyldimethoxysilane, di-iso-propyldimethoxysilane, di-n-propyldiethoxysilane, di-iso-propyldiethoxysilane, di-n-butyldimethoxysilane, di-iso-butyldimethoxysilane, di-t-butyldimethoxysilane, di-n-butyldiethoxysilane, n-butylmethyldimethoxysilane, bis(2-ethylhexyl)dimethoxysilane, bis(2-ethylhexyl) diethoxysilane, dicyclohexyldimethoxysilane, dicyclohexyldiethoxysilane, dicyclopentyldimethoxysilane, dicyclopentyldiethoxysilane, bis(3-methylcyclohexyl) dimethoxysilane, bis-(4-methylcyclohexyl) dimethoxysilane, bis(3,5-dimethylcyclohexyl) dimethoxysilane, cyclohexylcyclopentyldimethoxysilane, cyclohexylcyclopentyldiethoxysilane, cyclohexylcyclopentyldipropoxysilane, 3-methylcyclohexylcyclopentyldimethoxysilane, 4-methylcyclohexylcyclopentyl-dimethoxysilane, 3,5-dimethylcyclohexylcyclopentyldimethoxysilane, 3-methylcyclohexylcyclohexyldimethoxysilane, 4-methylcyclohexylcyclohexyldimethoxysilane, 3,5-dimethylcyclohexylcyclohexyldimethoxysilane, cyclohexylmethyldimethoxysilane, cyclohexylmethyldiethoxysilane, cyclohexylethyldimethoxysilane, cyclohexyl(iso-propyl) dimethoxysilane, cyclohexylethyldiethoxysilane, cyclopentylmethyldimethoxysilane, cyclopentylmethyldiethoxysilane, cyclopentylethyldiethoxysilane, cyclopentyl(iso-propyl) dimethoxysilane, cyclohexyl(n-pentyl)dimethoxysilane, cyclohexyl(n-pentyl)diethoxysilane, cyclopentyl(iso-butyl) dimethoxysilane, cyclohexyl(n-propyl)dimethoxysilane, cyclohexyl(n-propyl)diethoxysilane, cyclohexyl(n-butyl) diethoxysilane, cyclohexyl(iso-butyl)dimethoxysilane, diphenyldimethoxysilane, diphenyldiethoxysilane, phenylmethyldimethoxysilane, phenylmethyldiethoxysilane, phenylethyldimethoxysilane, phenylethyldiethoxysilane, methyltrimethoxysilane, methyltriethoxysilane, ethyltrimethoxysilane, ethyltriethoxysilane, n-propyltrimethoxysilane, n-propyltriethoxysilane, iso-propyltrimethoxysilane, iso-propyltriethoxysilane, n-butyltrimethoxysilane, iso-butyltrimethoxysilane, t-butyltrimethoxysilane, n-butyltriethoxysilane, 2-ethylhexyltrimethoxysilane, 2-ethylhexyltriethoxysilane, cyclohexyltrimethoxysilane, cyclohexyltriethoxysilane, cyclopentyltrimethoxysilane, cyclopentyltriethoxysilane, vinyltrimethoxysilane, vinyltriethoxysilane, phenyltrimethoxysilane, phenyltriethoxysilane, tetramethoxysilane, tetraethoxysilane, tetrapropoxysilane and tetrabutoxysilane.

In the polymerization process of the present invention, the polymerization of olefins is accomplished by the polymerization or copolymerization of olefins in the presence of a catalyst made of the foregoing solid catalyst component (A), organic aluminum compound (B) and organic silicon compound (C). The ratio of the various components to be used is arbitrary and not specifically limited unless the effects of the present invention are impaired. In general, the proportion of the organic aluminum compound (B) is from 1 to 1,000 mols, preferably from 50 to 800 mols per mol of titanium atom in the solid catalyst component (A). The proportion of the organic aluminum compound (C) is from 0.002 to 10 mols, preferably from 0.01 to 2 mols, more preferably from 0.01 to 0.5 mol per mol of the component (B).

The order of contact of each component is arbitrary. Preferably, organic aluminum compound (B) is charged first into a polymerization system, and then brought into contact with organic silicon compound (C), and further contact with solid catalyst component (A).

The process for polymerization of the present invention may be carried out in the presence or absence of an organic solvent. The olefin monomer to be polymerized may be used in either a gaseous state or a liquid state. During the polymerization, hydrogen may be used as a molecular weight modifier. The polymerization temperature is not higher than 200° C., preferably not higher than 100° C. The polymerization pressure is not higher than 10 MPa, preferably not higher than 5 MPa. The continuous polymerization process or batchwise polymerization process may be applied. Further, the polymerization reaction may be carried out in one step or two or more steps.

The olefins to be homopolymerized or copolymerized by the process of the present invention include ethylene, propylene, 1-butene, 1-pentene, 4-methyl-1-pentene and vinylcyclohexane. These olefins may be used singly or in combination of two or more of them. Among these olefins, ethylene and propylene are preferably used.

The polymerization (hereinafter referred as "main polymerization") of olefins in the presence of the catalyst made of the foregoing solid catalyst component (A), organic aluminum compound (B) and organic silicon compound (C) is preferably preceded by prepolymerization to further enhance the catalytic activity and the stereoregularity, particle properties of the polymer thus produced and the like. As the monomers to be used in the prepolymerization there may be used the same olefins as main polymerization as well as monomers such as styrene.

In the prepolymerization, the order of contact for each component and monomer is arbitrary. Preferably, the organic aluminum compound (B) is charged into the prepolymerization system set up to the atmosphere of inert gas or olefin gas to be polymerized, and after contacting with the solid catalyst component (A), brought into contact with one or more olefins. In the case of conducting prepolymerization on combination with the organic silicon compound (C), preferably, the organic aluminum compound (B) is charged into the prepolymerization system set up to the atmosphere of inert gas or olefin gas to be polymerized, and after contacting with the organic silicon compound (C) and further the solid catalyst component (A), brought into contact with one or more olefins.

In case that the polymerization of olefins is carried out in the presence of the catalyst for polymerization of olefins formed by the invention, the xylene solubles (XS) of polymer produced decrease 20% or more in comparison with the polymer produced by a conventional method. Namely, it was confirmed the effect that a polymer having extremely high stereoregularity can be obtained in a high yield.

The present invention will be further described in the following examples as compared with the comparative examples.

EXAMPLE 1

Preparation of Solid Component (a)

Into a 2000-ml round flask equipped with an agitator in which had been thoroughly replaced by nitrogen gas were charged 150 g of diethoxymagnesium and 750 ml of toluene to make a suspension. The suspension was then added to a solution of 450 ml of toluene and 300 ml of titanium tetrachloride pre-charged into a 3000-ml round flask equipped with an agitator in which had been thoroughly replaced by nitrogen gas. To the suspension was then added 54 ml of di-n-butyl phthalate and the suspension was heated to 110° C. On the way of such heating, 60 ml of dimethylpolysiloxane was added thereto. The temperature of the reaction system was raised to 110° C. where the suspension was then reacted for 2 hours. After the termination of the reaction, the resulting solid reaction product was then washed with toluene. Thereafter, to the resulting solid reaction product were added 1200 ml of toluene and 300 ml of titanium tetrachloride. The mixture was then processed with stirring at a temperature of 100° C. for 2 hours. Thereafter, the resulting solid reaction product was washed with n-heptane and separated by filtration and dried to obtain a powdered solid component. The solid component was then measured for Ti content. The result was 1.41% by weight.

Preparation of Solid Catalyst Component (A)

Into a 500-ml round flask equipped with an agitator in which had been thoroughly replaced by nitrogen gas were charged 10 g of the forgoing solid component and 50 ml of heptane to make a suspension. To the suspension was added the mixed solution adding 0.01 ml of ethanol in 50 ml of heptane which was prepared previously. The mixture was reacted with stirring at a temperature of 50° C. for 1 hour to obtain solid catalyst component. The solid catalyst component was separated from suspension and then measured for Ti content. The result was 1.43% by weight.

Preparation of Polymerization Catalyst and Polymerization

Into a 2200 ml autoclave equipped with an agitator in which the air within had been completely replaced by nitrogen gas were charged the foregoing solid catalyst component in an amount of 0.0026 mmol as calculated in terms of titanium atom, 1.3 mmol of triethylaluminum and 0.13 mmol of cyclohexylmethyldimethoxysilane to form a polymerization catalyst. Into the autoclave were then charged 2000 ml of hydrogen gas and 1400 ml of liquid propylene. The mixture was then allowed to undergo prepolymerization at a temperature of 20° C. for 5 minutes and then main polymerization at a temperature of 70° C. for 1 hour.

Evaluation of Polymerization

On the polymer obtained by the forgoing polymerization, a polymerization activity per g of solid catalyst component (yield) and an amount of polymer undissolved when the polymer was extracted with boiling n-heptane for 6 hours (HI) were measured. The following equations (3) and (4) determined the polymerization activity and HI. Further, melt flow rate of the polymer produced (MI), bulk density (BD) and xylene solubles (XS) were measured. XS was determined by the equation (5). The results of the forgoing measurements are set forth in Table 1.

$$\text{Yield}(g\text{-}pp/g\text{-}cat.) = a\ (g)/\text{solid catalyst component } (g) \quad (3)$$

$$HI\ (\text{wt \%}) = \{b(g)/a(g)\} \times 100 \quad (4)$$

$$XS(\text{wt \%}) = \{c(g)/a(g)\} \times 100 \quad (5)$$

In the equations (3), (4) and (5) above, a shows a weight of polymer produced after termination of polymerization reaction, b shows a weight of n-heptane undissolved polymer when polymer was extracted with boiling n-heptane for 6 hours and c shows a weight of polymer dissolving in p-xylene when polymer produced after termination of polymerization reaction is dissolved with p-xylene at boiling point (about 138° C.) and then cooled to 23° C.

EXAMPLE 2

The procedure of Example 1 was followed to effect the preparation of a solid component, the preparation of a solid catalyst component and the evaluation of polymerization in the presence thereof except that 0.02 ml of 2-ethylhexanol was used instead of ethanol. Ti content of the resulting solid catalyst component was 1.41% by weight. The results of the evaluation of polymerization are set forth in Table 1.

EXAMPLE 3

The procedure of Example 1 was followed to effect the preparation of a solid component, the preparation of a solid catalyst component and the evaluation of polymerization in the presence thereof except that 0.02 ml of ethylene glycol was used instead of ethanol. Ti content of the resulting solid catalyst component was 1.40% by weight. The results of the evaluation of polymerization are set forth in Table 1.

EXAMPLE 4

The procedure of Example 3 was followed to effect the preparation of a solid component, the preparation of a solid catalyst component and the evaluation of polymerization in the presence thereof except that the amount of solid component (a) to be used was 7.5 g. Ti content of the resulting solid catalyst component was 1.45% by weight. The results of the evaluation of polymerization are set forth in Table 1.

EXAMPLE 5

The procedure of Example 3 was followed to effect the preparation of a solid component, the preparation of a solid catalyst component and the evaluation of polymerization in the presence thereof except that the amount of solid component (a) to be used was 5.0 g. Ti content of the resulting solid catalyst component was 1.39% by weight. The results of the evaluation of polymerization are set forth in Table 1.

EXAMPLE 6

The procedure of Example 1 was followed to effect the preparation of a solid component, the preparation of a solid catalyst component and the evaluation of polymerization in the presence thereof except that 0.2 ml of glycerine was used instead of ethanol. Ti content of the resulting solid catalyst component was 1.34% by weight. The results of the evaluation of polymerization are set forth in Table 1.

COMPARATIVE EXAMPLE 1

The procedure of Example 1 was followed to effect the preparation of a solid component and the evaluation of polymerization in the presence thereof except that the solid component (a) before contacting and treating with alcohol was used instead of the solid catalyst component (A). The results of the evaluation of polymerization are set forth in Table 1.

TABLE 1

| | Yield (g-PP/g-cat) | HI (wt %) | MI (g/10 min) | BD (g/ml) | XS (wt %) |
|---|---|---|---|---|---|
| Example 1 | 50,100 | 98.9 | 3.9 | 0.40 | 0.78 |
| Example 2 | 47,500 | 99.0 | 4.9 | 0.40 | 0.74 |
| Example 3 | 46,800 | 99.1 | 3.7 | 0.40 | 0.71 |
| Example 4 | 50,600 | 98.9 | 3.2 | 0.40 | 0.68 |
| Example 5 | 44,600 | 98.9 | 2.2 | 0.40 | 0.72 |
| Example 6 | 45,900 | 99.2 | 2.7 | 0.40 | 0.69 |
| Comparative Example 1 | 48,300 | 98.8 | 3.8 | 0.40 | 0.91 |

Industrial Applicability

As mentioned above, the polymer having an extremely low xylene solubles (XS) and superior stereoregularity can be produced in high yield by polymerizing olefins by using the polymerization catalyst of the present invention.

What is claimed is:

1. A solid catalyst component for polymerization of olefins, prepared by contacting a solid component comprising magnesium, a titanium halide, and an electron donor compound with an alcohol, wherein the solid component is prepared by contacting a magnesium compound with a titanium halide compound and an electron donor compound in the presence of an aromatic hydrocarbon in the liquid state at room temperature.

2. A solid catalyst component for polymerization of olefins as in claim 1, wherein said solid catalyst component is prepared by contacting a solid component with an alcohol after washing the solid component with a hydrocarbon solvent.

3. A solid catalyst component for polymerization of olefins as in claim 1, wherein said alcohol is a mono or poly valent alcohol having 1 to 12 carbon atom.

4. A solid catalyst component for polymerization of olefins as in claim 1, wherein said alcohol is used in an amount of 0.005 to 10 mols per mol of titanium atom in the solid component.

5. A solid catalyst component for polymerization of olefins as in claim 1, wherein said electron donor compound is an ester of a mono carboxylic acid and/or an ester of a dicarboxilic acid.

6. A solid catalyst component for polymerization of olefins as in claim 1, wherein said electron donor compound is a diester of phthalic acid.

7. A catalyst for polymerization of olefins, prepared from the following components (A), (B) and (C):

(A) the solid catalyst component as defined in claim 1;

(B) an organic aluminum compound represented by the general formula (1):

$$R^1_p AlQ_{3-p} \quad (1)$$

wherein $R^1$ represents a $C_{1-4}$-alkyl group; Q represents a hydrogen atom or a halogen atom; and p represents a real number of more than 0 to not more than 3; and (C) an organic silicon compound represented by the general formula (2):

$$R^2_q Si(OR^3)_{4-q} \quad (2)$$

wherein $R^2$ may be the same or different and represents a $C_{1-12}$-alkyl, cycloalkyl, phenyl, vinyl, allyl or aralkyl group; $R^3$ may be the same or different and represents a $C_{1-4}$-alkyl, cycloalkyl, phenyl, vinyl, allyl or aralkyl group; and q represents 0 or an integer of from 1 to 3.

8. A solid catalyst component for polymerization of olefins as in claim 1, wherein said aromatic hydrocarbon is toluene, xylene or ethylbenzene.

9. A solid catalyst component for polymerization of olefins as in claim 1, wherein said magnesium compound is a dialkoxymagnesium.

10. A solid catalyst component for polymerization of olefins as in claim 1, wherein said magnesium compound is diethoxymagnesium.

* * * * *